(12) United States Patent
Economy et al.

(10) Patent No.: US 10,726,700 B2
(45) Date of Patent: Jul. 28, 2020

(54) MODULAR CARBON MONOXIDE POISONING PREVENTION SYSTEM

(71) Applicants: Theodore F. Economy, Brooklyn, NY (US); Kenneth R. Karlin, Great Neck, NY (US)

(72) Inventors: Theodore F. Economy, Brooklyn, NY (US); Kenneth R. Karlin, Great Neck, NY (US)

( * ) Notice: Subject to any disclaimer, the term of this patent is extended or adjusted under 35 U.S.C. 154(b) by 0 days.

(21) Appl. No.: 15/391,762

(22) Filed: Dec. 27, 2016

(65) Prior Publication Data

US 2017/0193789 A1 Jul. 6, 2017

Related U.S. Application Data

(60) Provisional application No. 62/387,713, filed on Jan. 4, 2016.

(51) Int. Cl.
| | |
|---|---|
| G08B 17/10 | (2006.01) |
| G08B 21/14 | (2006.01) |
| G08C 17/02 | (2006.01) |
| F24F 11/30 | (2018.01) |
| F24F 11/62 | (2018.01) |
| F02D 17/04 | (2006.01) |
| F02D 33/00 | (2006.01) |
| G08B 25/00 | (2006.01) |
| B60R 25/042 | (2013.01) |
| G08B 25/10 | (2006.01) |
| G01S 19/16 | (2010.01) |
| F24F 110/50 | (2018.01) |
| F24F 11/65 | (2018.01) |
| F24F 110/72 | (2018.01) |

(52) U.S. Cl.
CPC ............ *G08B 21/14* (2013.01); *B60R 25/042* (2013.01); *F02D 17/04* (2013.01); *F02D 33/006* (2013.01); *F24F 11/30* (2018.01); *F24F 11/62* (2018.01); *G08B 25/009* (2013.01); *G08B 25/10* (2013.01); *G08C 17/02* (2013.01); *F24F 11/65* (2018.01); *F24F 2110/50* (2018.01); *F24F 2110/72* (2018.01); *G01S 19/16* (2013.01)

(58) Field of Classification Search
CPC ...... G08B 21/14; G08B 27/006; G08B 29/02; G08B 17/10; F02D 33/006; F02D 17/04; G01S 19/16; G01S 19/24; G08C 17/02; G08G 1/205; F24F 11/006; F24F 2011/0027; F24F 2011/0064; F24F 11/0017
See application file for complete search history.

(56) References Cited

U.S. PATENT DOCUMENTS

| | | |
|---|---|---|
| 4,345,242 A | 8/1982 | Ienna-Balistreri |
| 6,426,703 B1 | 7/2002 | Johnston et al. |
| 6,563,278 B2 | 5/2003 | Roman |

(Continued)

*Primary Examiner* — Dhaval V Patel
(74) *Attorney, Agent, or Firm* — Weiss & Weiss; Philip Weiss

(57) ABSTRACT

A carbon monoxide poison prevention system comprising: a system smartphone application; a system website functionality; hardware comprising a Bluetooth enabled smart carbon monoxide sensor; hardware comprising a portable carbon monoxide prevention system; and a module vehicle carbon monoxide prevention system, hardware comprising a building carbon monoxide prevention system or a combination of both module and hardware.

48 Claims, 10 Drawing Sheets

(56) References Cited

U.S. PATENT DOCUMENTS

| | | |
|---|---|---|
| 6,920,874 B1 | 7/2005 | Siegel |
| 6,998,991 B1 | 2/2006 | Goldstein et al. |
| 7,183,933 B2 | 2/2007 | Dzurke et al. |
| 7,567,174 B2 * | 7/2009 | Woodard ............... G08B 17/10 340/539.13 |
| 8,447,553 B1 * | 5/2013 | Roe ...................... G01R 31/003 702/108 |
| 8,618,942 B1 | 12/2013 | Billman |
| 8,643,467 B2 * | 2/2014 | Chutorash .......... G07C 9/00182 340/5.2 |
| 9,101,030 B2 | 8/2015 | Shen et al. |
| 9,194,358 B1 | 11/2015 | Avramidis |
| 9,196,146 B1 | 11/2015 | Vicente |
| 9,715,818 B2 * | 7/2017 | Poder ................... G08B 25/001 |
| 2006/0067863 A1 * | 3/2006 | Wheat ..................... B01J 8/008 48/127.9 |
| 2007/0124956 A1 | 6/2007 | Crnkovich |
| 2007/0125364 A1 | 6/2007 | Crnkovich |
| 2008/0198524 A1 * | 8/2008 | McConnell ............. F23D 14/82 361/91.2 |
| 2009/0139162 A1 | 6/2009 | Mancini |
| 2010/0201206 A1 | 8/2010 | Chilvers |
| 2010/0201531 A1 * | 8/2010 | Pakravan ............... G08B 21/14 340/632 |
| 2012/0112920 A1 | 5/2012 | Ramdeo |
| 2013/0093593 A1 | 4/2013 | Woods |
| 2013/0134342 A1 | 5/2013 | Shiffer |
| 2015/0057912 A1 * | 2/2015 | Ortmann ................ F02D 41/042 701/112 |
| 2015/0077243 A1 | 3/2015 | Hooper et al. |
| 2015/0096352 A1 * | 4/2015 | Peterson ................ G01N 27/02 73/31.02 |
| 2015/0097682 A1 | 4/2015 | Rossi et al. |
| 2016/0071388 A1 * | 3/2016 | Levons .................. G08B 21/24 340/584 |
| 2016/0096412 A1 * | 4/2016 | Mankame .......... B60H 1/00792 165/11.2 |
| 2016/0123587 A1 | 5/2016 | Ventura |
| 2016/0272341 A1 | 9/2016 | Van Horn et al. |

* cited by examiner

MODULAR CARBON MONOXIDE POISONING PREVENTION SYSTEM

RELATED APPLICATIONS

The present invention is based on provisional patent application No. 62/387,713 filed Jan. 4, 2016.

FIELD OF THE INVENTION

The present invention relates to a carbon monoxide poison prevention system comprising: a system smartphone application; a system website functionality; hardware comprising a Bluetooth enabled smart carbon monoxide sensor; hardware comprising a portable carbon monoxide prevention system; a module vehicle carbon monoxide prevention system, hardware comprising a building carbon monoxide prevention system or a combination of both module and hardware.

BACKGROUND OF THE INVENTION

Carbon Monoxide (referred to as "CO") is a colorless, tasteless, and odorless gas that cannot be detected naturally by humans. It is toxic in humans at levels above 35 ppm (parts per million, 10negative 6). In the United States, approximately 25,000 people per year are accidentally poisoned by CO of which approximately 500 per year are fatalities.

The present invention is an innovative multi module system that is designed to address the safety issues associated with CO poisoning along with other interesting value added ancillary features such as building CO monitoring, vehicle theft prevention, vehicle tracking, vehicle device interface capability, smart-building device interface capability, etc.

U.S. Pat. No. 4,345,242 relates to a gas detector providing a comparator having a sensing sequence for detecting a contaminated gas such as carbon monoxide. A first input disables the comparator for a period of time to prevent operation of an alarm to permit a heater of gas sensor to be initially energized to condition the associated gas sensing electrodes. A second input continually monitors the carbon monoxide concentration providing an alarm when sensing a high level of gas contamination. Third input continually activates alarm until power input de-energized. Fourth input provides predetermined reference voltage to comparator. Second comparator senses low or intermediate level of gas concentration to energize second signal and is likewise disabled by enable circuit for predetermined time.

U.S. Pat. No. 6,426,703 relates to a smoke sensor and carbon monoxide sensor integrated into a common detector housing. Smoke sensor is coupled to a smoke detector control integrated circuit generating a binary output signal indicative of smoke. Signal is coupled to a programmed microprocessor. Carbon monoxide sensor is coupled to microprocessor. Outputs from the two sensors are processed independently. In presence of smoke, smoke alarm generated by microprocessor. In presence of carbon monoxide, and absence of smoke, carbon monoxide alarm generated.

U.S. Pat. No. 6,563,278 relates to an automated garage door closing device for remote controlled overhead garage door. Circuit includes interval timer closing door after predetermined period of time, audible alarm activated upon door reaching fully open position, device for activating automated closing device. A carbon monoxide detector is inserted in the circuit to provide activation of door opening cycle if level of carbon monoxide reaches dangerous level.

U.S. Pat. No. 6,920,874 relates to ventilating range hood that drives speed fan according to state of four air quality sensors: temperature, humidity, carbon monoxide and smoke. A micro-controller integrates the four signals and determine ventilation requirement. Value is converted into a signal to drive fan. Visual indicators display state of each air quality factor. Audible alarm is activated if levels remain hazardous for more than predetermined time interval after fan turned off.

U.S. Pat. No. 6,998,991 relates to a sensor system with catalyst for control and one with a dummy catalyst. Apparatus determines concentration of CO, water vapor and temperature. The signal from the CO determined by numerically compensating for humidity changes. The device optically monitors control and CO responding sensors that respond to CO by monitoring optical change to humidity in one and humidity and CO in other and provide means to remove humidity.

U.S. Pat. No. 7,183,993 relates to a garage monitoring system with an automatic garage door opening mechanism that includes a carbon monoxide detector to sense presence of carbon monoxide within garage and generate audible alarm when carbon monoxide reaches predetermined level in garage. Heater adjacent carbon monoxide detector to maintain carbon monoxide detector above minimum operational temperature. Position sensor determines position of garage door and generates signal. Monitoring mechanism interfaces with garage door opening mechanism and includes acoustic detector including audible alarm from carbon monoxide detector generating signal to garage door opening mechanism to open garage door when carbon monoxide detector generates alarm and garage door position sensor indicates garage door closed.

U.S. Pat. No. 7,567,174 relates to device for determining and automatically transmitting geographic location of wireless alarm device, includes smoke alarm, during emergency using enhanced wireless communication and position location systems. The wireless transceiver can be a cellular processor comprising multiple radio frequency bands and air interface standards with integrated memory for storing emergency identification information. Can include integrated assisted global positioning receiver and broadcast television receiver. Upon sensing smoke, wireless transceiver automatically transmits stored emergency identification signals and geographic location or wireless alarm device to dispatch center.

U.S. Pat. No. 8,447,553 relates to a system to increase electronic device reliability. The device detects potential failure of electronic device, testing device when screening indicates potential failure and provide one or more outputs if testing indicates failure. System to screen device by expert system to detect potential failure, selectively testing device when screening indicates potential failure and provides one or more outputs if testing indicates failure.

U.S. Pat. No. 8,618,942 relates to an extended smoke alarm system having wireless-signal-send-and-receive functionalities where the system includes one or more flashlights.

U.S. Pat. No. 9,101,030 relates to LED lighting devices having air quality detection functions for detecting air quality. A controller unit processes the data corresponding to the air quality parameter, LED light source provides lighting, providing real-time air quality monitoring.

U.S. Pat. No. 9,194,358 relates to an automotive carbon monoxide sensor including a sensor housing secured to a ceiling surface of a vehicle. Sensor includes motion sensor, heat sensor, and carbon monoxide sensor. Sensor housing is wired connected with seat belt sensor and a weight sensor located in or around a driver seat of vehicle. Seat belt sensor, weight sensor, motion sensor, heat sensor, and carbon monoxide sensor all collectively monitor plurality of parameters that involve audible alarm sounded by horn. First wire connects to vehicle battery. Wire connects to weight sensor. Second wire connects weight sensor to vehicle horn.

U.S. Pat. No. 9,196,146 relates to a vehicular carbon monoxide detector to detect unsafe levels of carbon monoxide in and around vehicle issuing an alarm to alert persons near vehicle to elevated level of carbon monoxide associated with vehicle. The vehicular carbon monoxide detector system includes internal and external carbon monoxide sensor both wired to vehicle computer. Vehicle computer wired to vehicle battery device to operate carbon monoxide detector, uses a cellular transceiver for communication with cellular phone or vehicle horn, headlights or windows.

U.S. Pat. No. 9,208,676 relates to apparatus and computer programs for home security, including intelligent multi-sensing, network-connected devices that communicate with each other or with a central server or a cloud-computing system to provide home security.

US patent publication 2007/0124956 relates to a gas clothes dryer having a carbon monoxide sensor incorporated therewith to detect carbon monoxide that may show a blockage in the exhaust vent or improperly maintained appliance. The sensor determines an elevated level and provides a warning and may include an interface with home systems and text messaging.

US patent publication 2007/0125364 relates to a range hood having a carbon monoxide sensor positioned therein. The vent fan of the range hood is activated upon detection of carbon monoxide to increase ventilation of cooking area. Alarm provided. If carbon monoxide levels increase or persist, the range hood may increase speed of vent fan. Continued presence of carbon monoxide will result in warning. Interface to external warning is provided.

US patent publication 2008/0198524 relates to a gas arrestor system for sensing and shutting down a gas burning appliance via a circuit to perform both functions. The system detect specific gases and specific concentration levels by way of a sensory power circuit. The circuit performs vapor detection and provides power to various ignition portions of appliance. When gas or gas vapors are detected in ambient air of circuit and satisfy threshold for particular vapor, the circuit is shorted which results in a power loss to at least ignition portions of appliance, and undesirable ignition of such vapors is mitigated.

US patent publication 2009/0139162 relates to a bedroom window that detects predetermined levels of carbon monoxide and automatically open by itself to save lives without electrical supply, batteries or human action. The device is solar powered and opens window sash to allow CO to escape, sounds alarm and trigger alarm to emergency workers.

US patent publication 2010/0201531 relates to a carbon monoxide detection apparatus having one or more carbon monoxide sensors connected to an appliance. The sensors detect threshold level of carbon monoxide and activate appliance cutoff switch. Connection to appliance may be for measurement of carbon monoxide in substantially continuous flowing air stream, or measure in one airstream and other ambient. Audible alarm may be included.

US patent publication 2010/0201206 relates to a power control apparatus comprising a transducer having output connected to remotely activated device mounted in consumer unit. When predefined parameter is detected, the device is activated to connect a load between switched live output of residual current device and neutral input thereof creating imbalanced current flow on live and neutral output terminals of RCD causing contacts inside RCD to disconnect supply to an appliance circuit.

US patent publication 2012/0112920 relates to a carbon monoxide and smoke alarm device that includes a housing mountable to a ceiling in a building having a carbon monoxide sensor and a smoke sensor. Audible alarm is also disposed. Processor/memory unit is in housing activated by sensor. Transducer in housing activated by processor/memory unit to send signal to person at remote computer and person's cell phone.

US patent publication 2013/0093593 relates to a smoke and carbon monoxide detector, alarm, transmitter and cutout switch system. The device sounds an alarm and transmits electronic signals to cutout switches causing interruption in electrical and/or gas supply.

US patent publication 2013/0134342 relates to a gas safety valve used in combination with an existing carbon monoxide system that includes at least one carbon monoxide detector, a signal wire system, a breaker box, gas meter box, notification system, primary gas line and back-up power source. Gas safety valve is integral to primary gas line in communication with carbon monoxide detectors with electrical signal line that transmits low voltage electronic signal to gas safety valve when carbon monoxide is detected.

US patent publication 20150057912 relates to a vehicle carbon monoxide detection system for an internal combustion engine; a controller interfacing with the engine; a carbon monoxide sensor that detects level or carbon monoxide interfacing with the controller. The controller prevents and terminates operation of vehicle engine if level of carbon monoxide detected by sensor exceeds threshold carbon monoxide level.

US patent publication 2015/0077243 relates to an automatic AC power interruption system built into a portable apparatus or into electrical systems and appliance control circuitry. Power is interrupted when smoke detector alarm signal is detected. A portable device may be plugged into a power outlet having a GFCI breaker and when hazard alarm is detected, trips off power to outlet. Signal activated circuit interrupters may be integrated into appliance control circuitry and interrupt power in problematic device when hazard condition detected. Other alarms may indicate toxic fumes, motor overload, natural gas, radon, or carbon monoxide.

US patent publication 2015/0097682 relates to system for displaying hazard events and adjusting hazard detector settings on a mobile device that includes an interface on mobile device, hazard detector, and computer server system coupled to mobile device and hazard detector. Hazard detector detects smoke or carbon monoxide, and transmits to computer system and then mobile device. User interface receives adjusted value for setting of hazard detector and transmits to computer.

US patent publication 2016/0123587 relates to a heating system shut-off safety assembly having a housing coupled to an electrical line for a heating unit. Processor is coupled to housing and electrical line to allow and restrict current in the electrical line. A first carbon monoxide sensor is coupled to the housing and processor to detect carbon monoxide. A heat sensor and a smoke sensor is also coupled. A second carbon monoxide sensor is coupled to a warm air discharge and the processor to detect carbon monoxide in the warm air discharge. Processor restricts current in the electrical line when the first and second carbon monoxide sensor, and the smoke sensor detects carbon monoxide or smoke to disable the heating line.

US patent publication 2016/0272341 relates to a device to improve safety, maintenance and management of aircraft. Device continuously monitors several sensors to perceive environment inside and outside aircraft. Readings sent periodically or in real time to ground station that logs readings and creates a detailed aircraft log. If device detects unsafe value or change to sensor, will trigger alarm to pilot and ground station. Aids pilot in corrective action.

SUMMARY OF THE INVENTION

The present invention relates to hardware and software products to prevent carbon monoxide poisoning. It is an object of the present invention for the products to operate individually by detecting and stopping carbon monoxide at the source as well as interfacing between elements of the system. It is an object of the present invention to alert an individual along with family members, agencies, and others through various mechanisms.

It is an object of the present invention for the software products to comprise a system smartphone application. It is an object of the present invention for the software products to comprise system website functionality.

It is an object of the present invention for the hardware products to comprise a module vehicle carbon monoxide prevention system. It is an object of the present invention for the vehicle carbon monoxide prevention system comprise a base that is Bluetooth enabled with fuel pump inhibit relay and power scavenge capability. It is an object of the present invention for the hardware sensor to have Bluetooth enabled smart carbon monoxide sensor. It is an object of the present invention for the vehicle carbon monoxide system to further comprise a vehicle cellular/GPS add on module.

It is an object of the present invention for the hardware to comprise a portable carbon monoxide prevention system. It is an object of the present invention for this to comprise a base portable generator heater that is Bluetooth enabled with fuel line inhibit valve.

It is an object of the present invention for the hardware to comprise a building carbon monoxide prevention system. It is an object for this device to comprise a sensor base that comprises a smart carbon monoxide sensor with cellular, Wi-Fi, Ethernet, or battery backup. It is an object of the present invention for the building device to have a sensor that is Wi-Fi-enabled smart carbon monoxide sensor. It is an object of the present invention for the building device to comprise a remote switch that comprises a building Wi-Fi enabled smart switch furnace cutoff.

It is an object of the present invention for the system to further comprise smoke alarm integration.

It is an object of the present invention for the system modules to be connected through various radio frequencies, including but not limited to, Bluetooth, Wi-Fi, Cellular, Global Positioning System (GPS), and Zigbee.

It is an object of the present invention for the system to detect the presence of carbon monoxide, both absolute and rate of change, then taking intelligent action to inhibit the creation of more carbon monoxide, as well as generating various audible and data alarms and escalating notifications, including notification of friends and/or family, fire, rescue and police.

The module vehicle base unit is Bluetooth enabled with fuel pump inhibit relay and power scavenge capability component. The device is mounted or connected to the vehicle's fuse block and therefore is of a diminutive size. It is a Bluetooth enabled smart carbon monoxide sensor unit having smartphone application.

It is an object of the present invention for the device to interrupt current to the fuel pump by opening the fuel pump inhibit relay and breaking the circuit depriving or starving the engine of fuel and as a result stopping combustion and the creation of carbon monoxide. Although a vehicle engine is described above, the system can be applied to any form of combustion that creates carbon monoxide, such as a furnace, generator, portable heater, and any device that relies on combustion of carbon based fuels that as a result of that combustion generates carbon monoxide.

In the case of a gravity feed fuel system common in oil furnaces, generators and small combustion engines, the fuel flow will be interrupted by a valve that will deprive or starve the engine of fuel and as a result stop combustion and the creation of carbon monoxide.

It is an object of the present invention for the device to interface and activate other devices such as, Windows, ignition, radio via OBDII/CAN BUS technology.

It is an object of the present invention for the system to interface and actuate other smart building devices such as a garage door, alarm, fire system and video surveillance.

It is an object of the present invention for the system to be powered by an inline power scavenging circuit.

It is an object of the present invention for the system to accept add on modules for example, vehicle cellular/GPS.

It is an object of the present invention for the system to interface with services such as, GM OnStar, Automatic, Drone Mobile by Compustar, Mojio, Zubie, and others to stop the engine of a car as well as other value added features.

The present invention relates to a module sensor that is a Bluetooth enabled smart carbon monoxide sensor unit that is a battery powered ultra low power device that monitors ambient carbon monoxide levels as well as broadcasting them periodically or event driven broadcasts when thresholds are crossed via Bluetooth low energy RF technology. It is an object of the present invention for the device to send informational heartbeat messages to the module base, Bluetooth enabled vehicle base unit with fuel pump inhibit relay, as well as the module cellular/GPS and module smartphone application. These informational heartbeat messages can then be escalated based on intelligence based in the vehicle base unit and the smartphone application, and their further interface capabilities.

A heartbeat is a periodic signal generated by the module or device to indicate normal operation of the module or device. It is an object of the present invention in order for the device or module to greatly enhance power conversation, this device essentially is dormant for a configurable period then is woken up, and determines and transmits carbon monoxide levels to the module where further actions may be taken based on actual carbon monoxide levels.

It is an object of the present invention to use the vehicle cellular/GPs add on with the vehicle base unit. The use of a machine to machine cellular modem is limited in range only by the cellular connectivity. This, coupled with the GPS receiver unit provides a complete tracking system that could be used to locate a stolen vehicle, monitor the location of a vehicle for fleet monitoring, or tracking of new driver. Additionally, it is an object of the present invention for the cellular modem to communicate directly with the website to initiate the above actions. These actions include remotely immobilizing the vehicle via cellular connectivity and interrupting current to the fuel pump by opening the fuel pump inhibit relay and breaking the circuit depriving or starving the engine of fuel and as a result stopping combustion and immobilizing the vehicle.

The present invention comprises a building smart carbon monoxide sensor base with cellular, Wi-Fi, Ethernet and battery backup. The device provides a fault tolerant solution that can detect, notify and prevent further generation of carbon monoxide if connected to a device that has shutoff capability or some other form of shutoff device.

It is an object of the present invention for the building sensor base to be primarily powered by house current via an external power supply that provides dc voltage to the module. This allows for use internationally with differing power grid characteristics. It is an object of the present invention for the device to include a battery backup to sustain full operation for a reasonable time. It is an object of the present invention for the device when it is operated by battery power to alert the user via audible tones via the onboard piezo element. It is an object of the present invention for the device when it is operated by battery power to alert the user via smartphone interface as well as the website.

It is an object of the present invention that if the battery backup drains completely with no interaction, the website functionality will interpret the lack of communication as a potentially serious event and escalate notifications accordingly as determined by the software configuration.

It is an object of the present invention for the device to have Bluetooth capability for short range communication as well as programming and interface capability to the smartphone application.

It is an object of the present invention for the device to contain an on board carbon monoxide sensor coupled to a micro-controller which allows for unique processing of actual carbon monoxide levels and rate of change of carbon monoxide levels to create events that in turn trigger various programmable and configurable escalating actions, alerts, notifications and alarms. In a preferred embodiment, the system is not merely activated by crossing a carbon monoxide threshold but, activated when a rate of change threshold with respect to time is reached and exceeded.

It is an object of the present invention for the device to interface with one or more remote sensor units that monitor carbon monoxide levels.

It is an object of the present invention for the device to contain onboard Wi-Fi capability that will connect to the local router to enable Internet connectivity.

It is an object of the present invention for the device to contain onboard cellular capability that will connect to the local Internet periodically to test the connection as well as serve as a failsafe backup if the wired or Wi-Fi systems cease to have Internet connectivity. It is an object of the present invention for the device to contain a wired RJ45 connector for hardwiring the Ethernet connection to establish internet connectivity.

It is an object of the present invention for the device to use Wi-Fi as the method of internet connectivity to be used in the event of an alert. The message will use an ACK protocol to ensure close loop messaging. In the event a message is sent to the server and an acknowledgement is not received, the system will automatically escalate to the cellular network where the same type ACK protocol will be used to ensure close loop messaging.

It is an object of the present invention for the device to contain an onboard high volume piezo element.

It is an object of the present invention for the device to be connected to an existing alarm system.

It is an object of the present invention for the device to have contact closures available to shut off a variety of hardwired devices such as furnaces, generators and other hard wired devices.

It is an object of the present invention for the device to have programmatic capability to shut off other internet or Wi-Fi connected devices such as electronic thermostats, or other internet or Wi-Fi connected devices.

The present invention further comprises a remote sensor that is a Wi-Fi enabled smart carbon monoxide sensor unit that is a line current power with battery back up powered device that monitors ambient carbon monoxide levels as well as broadcasting them periodically or event driven broadcast when threshold carbon monoxide levels or carbon monoxide rate of change with respect to time threshold are crossed via Wi-Fi RF technology to the base unit. It is an object of the present invention for the unit to send informational heartbeat messages to the Wi-Fi enabled base unit and ultimately to the smartphone via web functionality. These informational heartbeat messages can then be escalated based on intelligence from the smartphone and web and their further interface capabilities. A heartbeat is a periodic signal generated by the module or device to indicate normal operation of the module or device. It is an object of the present invention to greatly enhance power conversation of the device by having the device be essentially dormant for a configurable period of time then wakeup and determine and transmit carbon monoxide levels to the base where further actions and escalations may be taken based on actual carbon monoxide levels. It is an object of the present invention for the device to have Bluetooth capability for short range communication as well as programming and interface capability to a smartphone application.

The present invention further comprises a remote switch building Wi-Fi smart switch such as for use with a furnace cutoff. This is a line current power with battery backup powered device that opens the furnace emergency shutoff circuit and thereby stops further creation of carbon monoxide. Physically the unit resembles a standard wall type switch with mechanical functionality as well. The unit can send informational heartbeat messages to the Wi-Fi enabled base unit and ultimately to the smartphone via website functionality. These informational heartbeat messages can then be escalated based on intelligence from the smartphone and website and their further interface capabilities. A heartbeat is a periodic signal generated by the module or device to indicate normal operation of the module or device. It is an object of the present invention for the device to have Bluetooth capability for short range communication as well as programming and interface capability to the smartphone application.

The present invention further comprises a smartphone application. The smartphone application is a primary electronic connection to a system through various RF technologies. The management of the system is set up through Bluetooth and Wi-Fi pairing interfaces. It is an object of the present invention to provide system dashboard functionality that gives the smartphone instant access to: battery life, communication capabilities, and important system status values. The application provides theft deterrent fuel pump inhibit interface. The smartphone application provides real-time moving map display integration of GPS location data. The smartphone application provides website integration.

It is an object of the present invention with the smartphone application to have an accelerometer interface back to the vehicle carbon monoxide prevention system. The Bluetooth enabled vehicle base unit with fuel pump inhibit relay determines if the user is present and the vehicle is moving.

The present invention further comprises adding the smartphone application to the vehicle carbon monoxide prevention system and the vehicle base unit. The smartphone will then have remote interface capability to the vehicle carbon monoxide prevention system and the vehicle base unit and all related and derived features and capabilities.

The following is a step by step functional overview of the core functionality of the present invention.

Initial Bluetooth pairing and setup is orchestrated by a system smartphone application and its native common user interface. The system smartphone application pairs directly with the Bluetooth enabled vehicle base unit with fuel pump inhibit relay and Bluetooth enabled smart carbon monoxide sensor unit.

The system smartphone application pairs with the Bluetooth enabled vehicle base unit with fuel pump inhibit relay directly to the Bluetooth enabled smart carbon monoxide sensor unit.

The Bluetooth enabled smart carbon monoxide sensor unit will begin monitoring the local ambient atmosphere for carbon monoxide levels through the attached electro-chemical carbon monoxide sensor, or a similar device.

The Bluetooth enabled smart carbon monoxide sensor unit periodically transmits carbon monoxide levels to the system smartphone application.

If a rise in carbon monoxide level begins to occur, the Bluetooth enabled smart carbon monoxide sensor unit sends event based messages to the system smartphone application. This functions as an early warning mechanism for the user of the system.

When elevated carbon monoxide levels are sensed, various alarms can start to be triggered via the built-in audio element (piezo, speaker, etc.) in the smartphone application and the vehicle base unit.

If the carbon monoxide threshold is exceeded, or if the rate of change (increase) of carbon monoxide level is above a predetermined threshold rate with respect to time and or location, the Bluetooth enabled vehicle based unit will then enter into fuel pump inhibit mode by opening the fuel pump inhibit relay and breaking the circuit depriving or starving the engine of fuel and as a result stopping combustion and the creation of carbon monoxide.

The system of the present invention can also be applied to any form of combustion that creates carbon monoxide, even if it does not use an engine.

Various escalating alerts and alarms can also be initiated by the system smartphone application, via its built in communication abilities as well as, interface capability to the website functionality. Example notifications that could be triggered could include, but not limited to, notification of friends and/or family, fire, rescue, police.

The system not only reacts when an absolute carbon monoxide threshold level has been exceeded, but additionally reacts when an increasing rate of change of carbon monoxide level occurs with respect to time and/or place.

The combination of the escalating alarms and carbon monoxide threshold and rate of change event generation, provides a very flexible event driven escalation path event driven on both various absolute carbon monoxide level threshold crossing as well as various carbon monoxide rate of change with respect to time and/or position event generation. All of the various threshold event triggers (absolute or rate of change) are programmable, and configurable based on predetermined values, historical data and best practices.

It is an object of the present invention for the system to serve as a theft deterrent mechanism because it can inhibit the starting of the engine by breaking the electrical circuit to the fuel pump. Since the Bluetooth enabled vehicle base unit with fuel pump inhibit relay is connected to the system smartphone application via Bluetooth, it has the ability to exercise the fuel pump inhibit relay thus depriving or starving the engine of fuel and as a result prohibiting the engine from starting.

The addition of the vehicle cellular/OPS add on module to the vehicle base unit Bluetooth enabled with fuel pump inhibit relay and power scavenge capability provides the smartphone with the remote interface capability to the base unit and all related and derived features and capabilities.

It is an object of the present invention for the system to have website functionality to serve as the centralized HUB of the system. The website and its related functionality receives and stores various system related data from each of the installed and registered systems. The system then processes the information as well as stores and uses the information with certain algorithms and transmits back to linked modules including the system smartphone application.

It is an object of the website functionality and its related systems to consume and intelligently analyze the received data and act accordingly as defined by well documented functional procedures. It is an object of the present invention to keep the intelligence at the website level, as this allows for the most intelligent and dynamic usage of the received data.

It is an object of the present invention for the website to have any one or more of the following functions and capabilities: Network activation if the carbon monoxide alert threshold is reached; Network activation if theft alert occurs; secure encryption; dashboard functionality; google maps integration; location based services; billing and accounting for monthly recurring monitoring costs; point of sale for system; crowd funding integration; and social media capabilities and interaction.

It is an object of the present invention to have multiple RF connection paths between each of the existing six modules to provide for a powerful, flexible and redundant carbon monoxide detection and poisoning prevention system as well as adding additional modules and features to the system.

It is an object of the present invention for the system to comprise a multi-tiered product that in addition to generating sales and profits from the manufacture and/or licensing of hardware, has a recurring subscription based service model that is applied to the system.

DETAILED DESCRIPTION OF THE INVENTION

Figure 1:
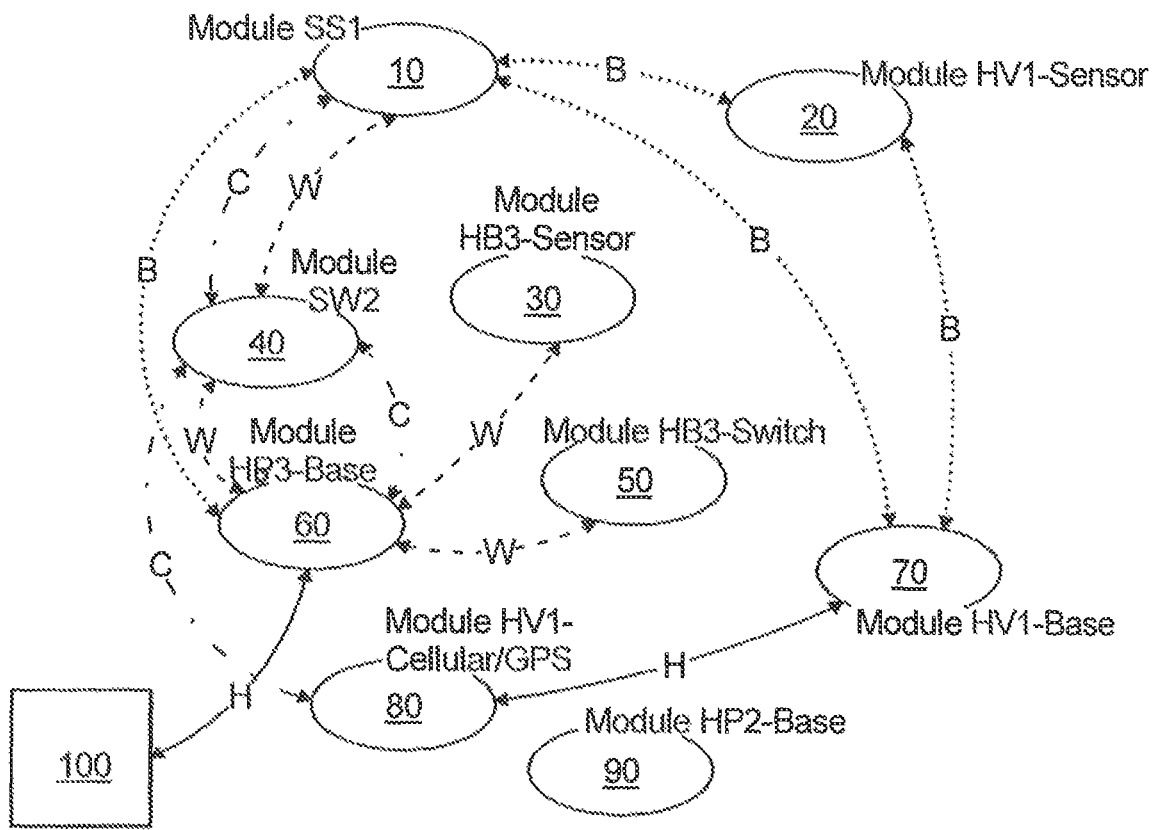
FIG. 1 is a flowchart of the Carbon Monoxide Poison prevention system overview.

FIG. 1 shows a flowchart of the carbon monoxide poison prevention system overview having the system smartphone application 10; the automobile Bluetooth enabled smart carbon monoxide sensor 20; the building Wi-Fi enabled smart carbon monoxide sensor 30; the system website functionality 40; the building Wi-Fi enabled cutoff switch 50; the building smart carbon monoxide sensor with cellular, Wi-Fi, Ethernet, Bluetooth, Battery Backup 60; the automobile base unit, Bluetooth enabled with fuel pump inhibit relay and power scavenge ability 70; an automobile cellular/GPS add on module 80; and a portable generator heater, base unit—with fuel line inhibit valve stand alone 90. A building router 100 is hardwired with the building smart carbon monoxide sensor The way the system works with the Bluetooth connection path B is as follows: the system smartphone application 10 is connected reciprocally to the building smart carbon monoxide sensor 60, the automobile Bluetooth enable smart carbon monoxide sensor 20 which is then reciprocally connected to the automobile base unit 70; and finally the system smartphone application 10 is reciprocally connected to the automobile base unit 70.

The way the system works with the Cellular connection path C is as follows: the system smartphone application 10 is connected reciprocally to the system website functionality 40 which is reciprocally connected both to the building smart carbon monoxide sensor 60 and the automobile cellular/GPS add on module 80.

The way the system works with the Wi-Fi connection path W is as follows: the system smartphone application 10 is connected reciprocally to the system website functionality 40. The system website functionality 40 is reciprocally connected to the building smart carbon monoxide sensor 60, which is then reciprocally connected to the building Wi-Fi enabled cut-off switch 50 and the building Wi-Fi enabled smart carbon monoxide sensor 30.

The way the system works with the hardwired connection path is the building router 100 is connected to the building smart carbon monoxide sensor 60. Further there is a hardwired connection between the automobile cellular/GPS add on module 80 and the automobile base unit 70.

Figure 2:
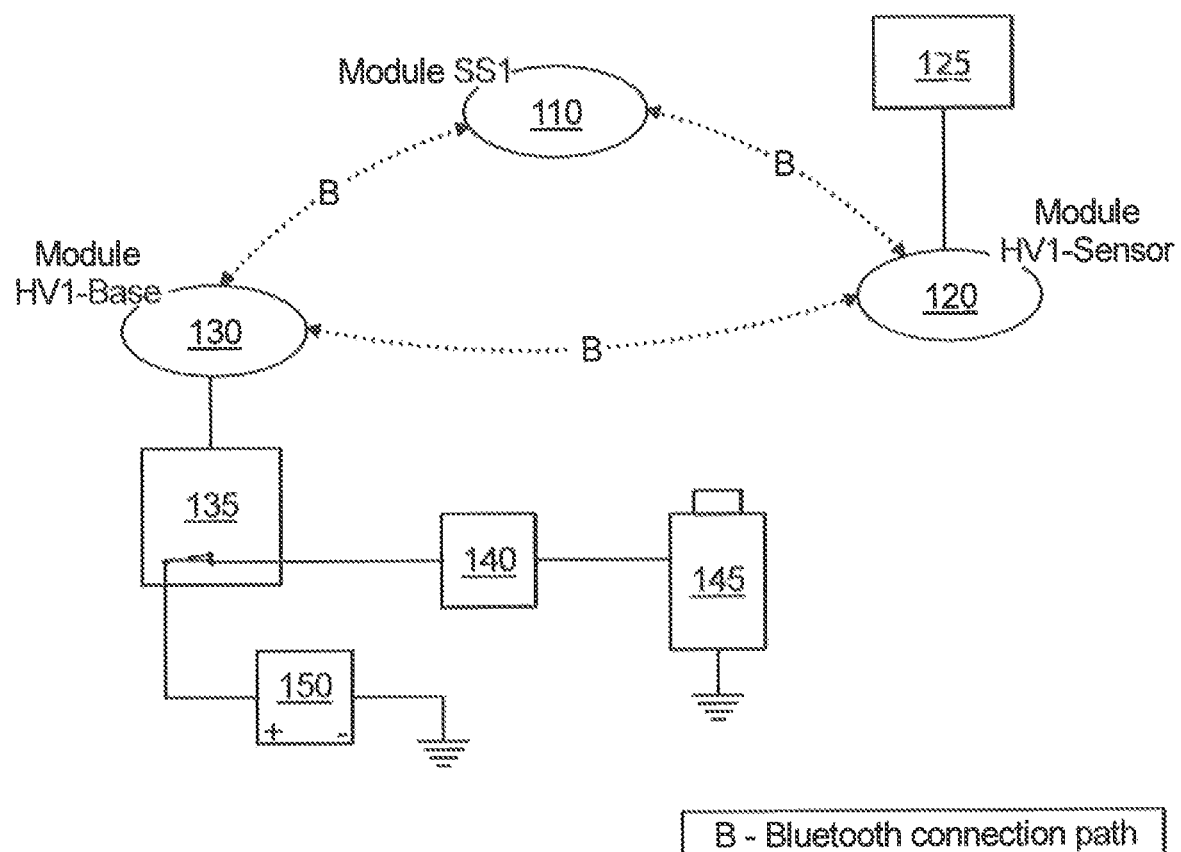
FIG. 2 is a flowchart of the automobile carbon monoxide poison prevention core functionality.

FIG. 2 shows the automobile carbon monoxide poison prevention core functionality flowchart. The system smartphone application 110 is connected via a Bluetooth connection path to a Bluetooth enabled smart carbon monoxide sensor 120 which contains the carbon monoxide sensor 125. The system smartphone application 110 is connected via a Bluetooth connection path to a Bluetooth enabled automobile base unit with a fuel pump inhibit relay 130 which is also connected via Bluetooth connection path to the Bluetooth enabled smart carbon monoxide sensor 120. The Bluetooth enabled automobile base unit 130 is comprised of the fuel pump inhibit relay 135, the fuel pump fuse 140, the fuel pump 145 and a battery 150.

Figure 3:
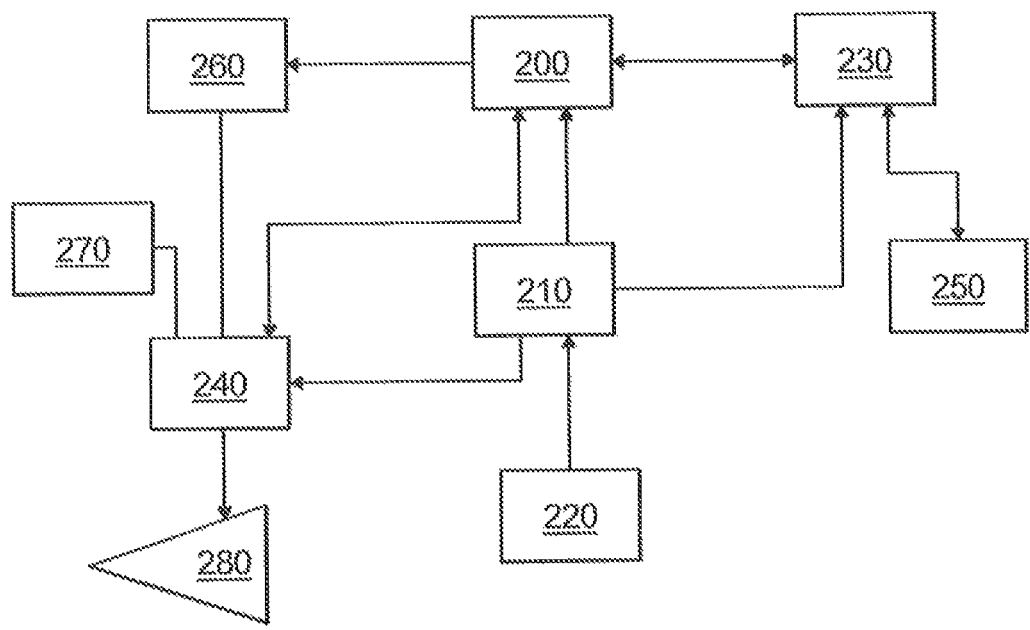
FIG. 3 is a flowchart of the automobile base unit-Bluetooth enabled with fuel pump inhibit relay and power scavenge capability.

FIG. 3 shows an automobile base unit, Bluetooth enable with fuel pump inhibit relay and power scavenge capability.

The microcontroller 200 is fed by the power management IC 210 which is fed by the power scavenge circuit 220. The Power management IC is also connected to the Bluetooth LE module 230 and the carbon monoxide interface companion IC 240. The Micro Controller 200 is reciprocally connected to the Bluetooth module 230 which is reciprocally connected to the Bluetooth Antenna 250. The Micro Controller 200 is connected to the Fuel Pump Inhibit Relay 260, which is connected to the carbon monoxide interface companion IC 240 which is connected to the carbon monoxide sensor 270 and the piezo alarm 280. The Micro Controller 200 is reciprocally connected to the carbon monoxide interface companion IC 240.

Figure 4:
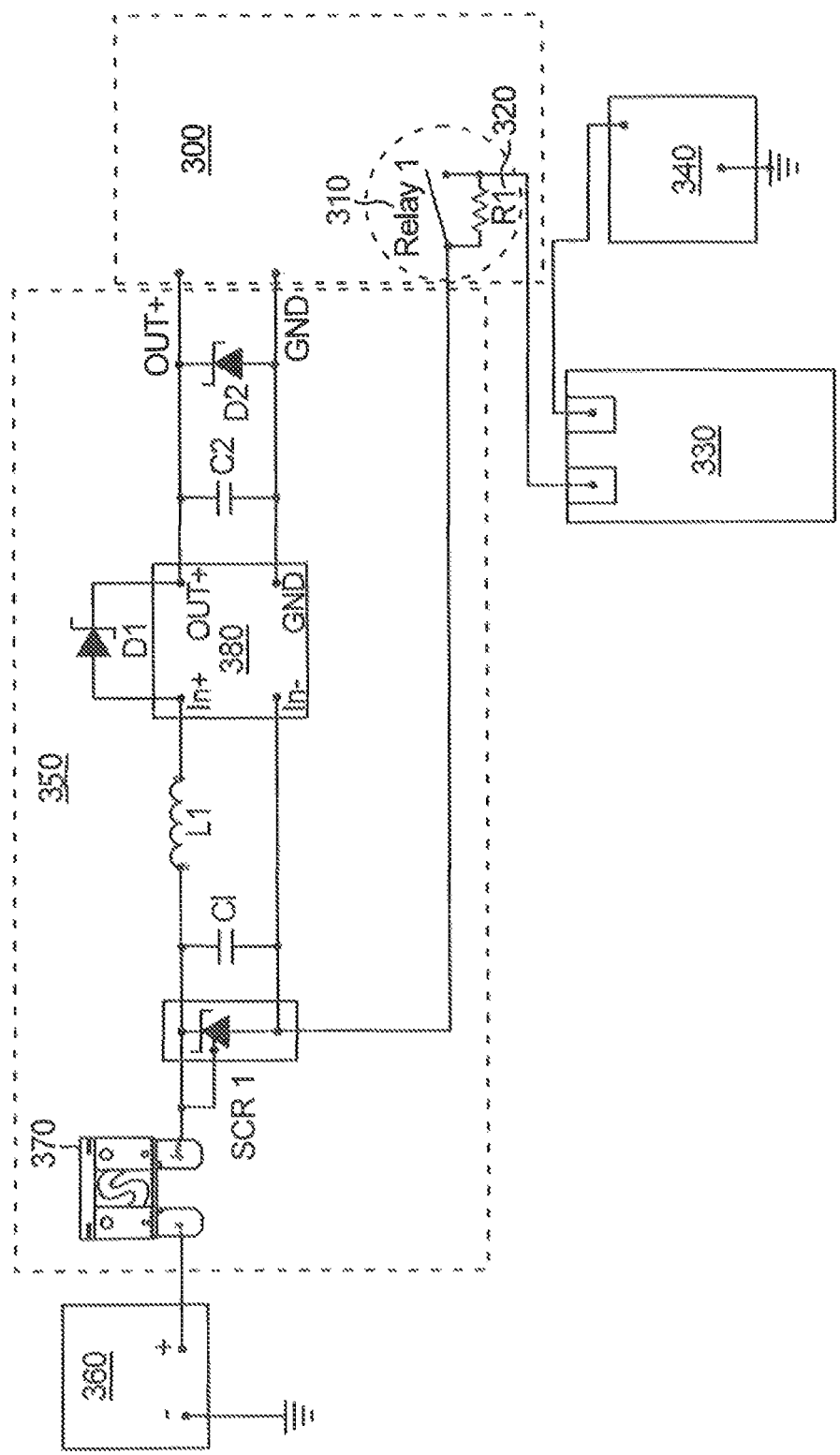
FIG. 4 is a flowchart of the power scavenge circuit and automobile interface.

FIG. 4 shows the base power scavenge circuit and automobile interface diagram. The automobile base unit-Bluetooth enabled with fuel pump inhibit relay and power scavenge capability 300 comprises a relay 1 contact 310 and a resistor R1 320. The relay R1 contact 310 is shown activated (opened) which inhibits fuel pump operation thus stopping combustion and further creation of carbon monoxide. The resistor R1 320 is of a high ohm value that when Relay 1 contact 310 opens R1 320 continues to allow minimal current for power scavenging circuit but orders of magnitude less current required by load device. The relay 310 and resistor 320 are connected to a vehicle fuse block 330 which is connected to a load device 340.

The power scavenge circuit 350 comprises a battery 360 connected in series with an existing fuse 370 which is physically removed from the vehicle fuse block and placed in series with the base unit circuitry 350. The circuitry 350 has a DC-DC converter 380.

Figure 5:
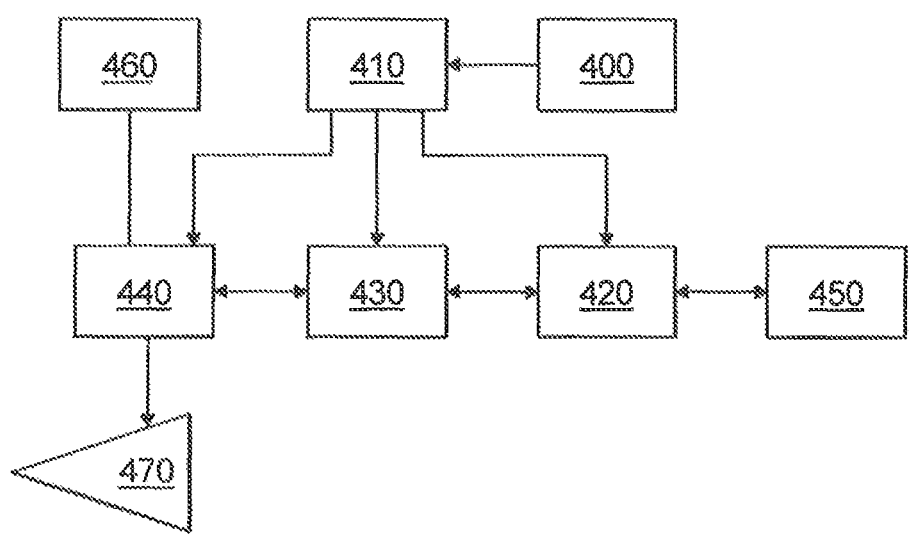
FIG. 5 is a flowchart of the automobile Bluetooth enabled smart carbon monoxide sensor system component.

FIG. 5 shows the automobile Bluetooth enabled smart carbon monoxide sensor system component. A battery 400 provides power to the power management IC 410 which is then connected to the Bluetooth LE module 420, the Micro Controller 430 and the carbon monoxide interface companion IC 440. The Bluetooth LE module 420 is reciprocally connected to the Bluetooth Antenna 450 and the Micro Controller 430. The Micro Controller 430 is also reciprocally connected to the CO interface companion IC 440. The CO interface companion IC 440 comprises a carbon monoxide sensor 460 and is connected to a piezo alarm 470.

Figure 6:
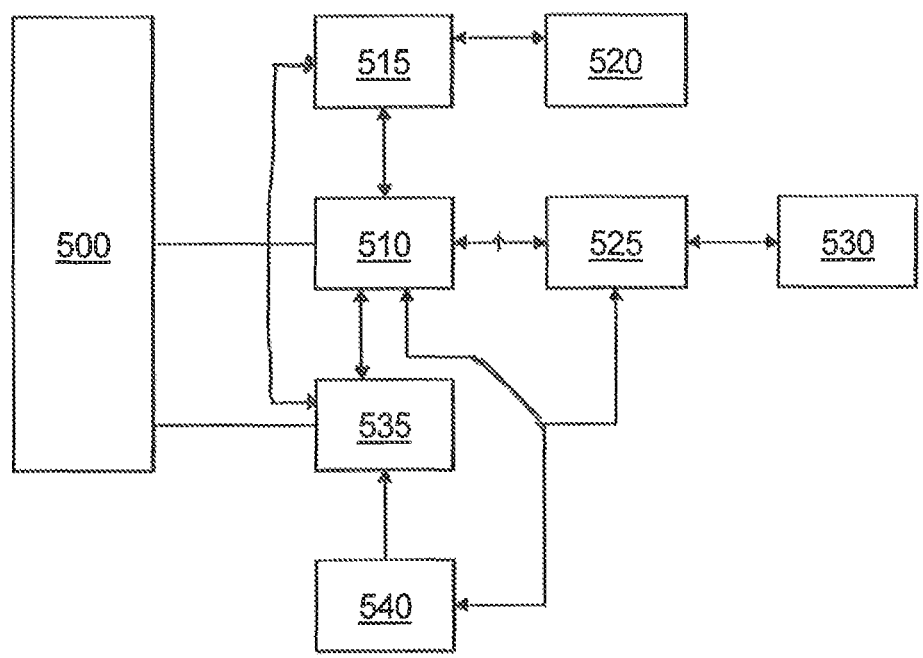
FIG. 6 is a flowchart showing the automobile cellular/GPS add on module.

FIG. 6 shows a chart of the automobile cellular/GPS add on module. The automobile base unit 500 Bluetooth enabled with fuel pump inhibit relay and power scavenge capability communicates via the micro controller 510 which is reciprocally connected to the GPS module 515 which is reciprocally connected to the GPS antenna 520. The micro controller 510 is also reciprocally connected to the cellular modem module 525 which is reciprocally connected to the cellular antenna 530. The micro controller 510 is reciprocally connected to the power charger and management 535 which receives power from a battery 540. The battery 540 is reciprocally connected to the micro controller 510 and the cellular modem 525. The power charger and management 535 is reciprocally connected to the GPS module 515.

Figure 7:
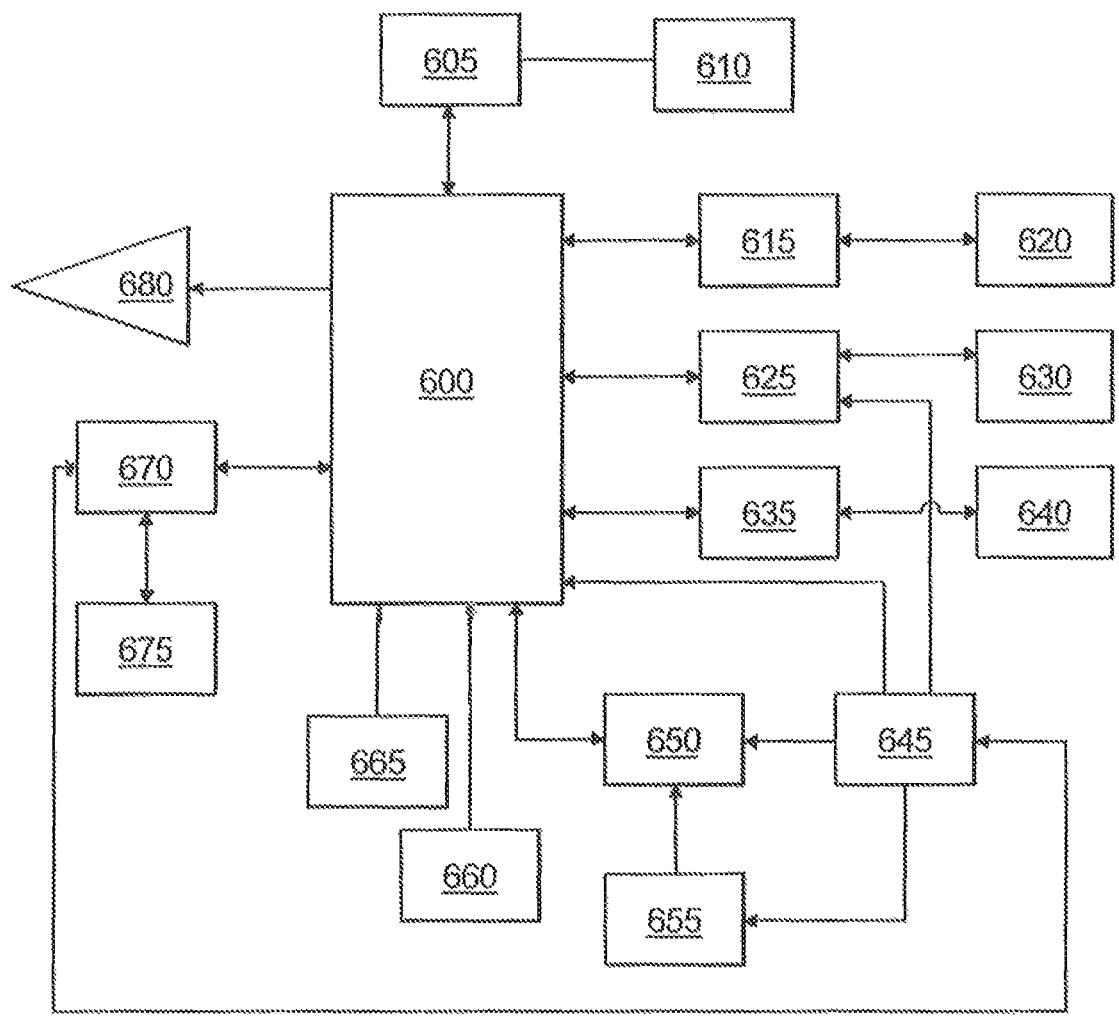
FIG. 7 is a flowchart showing the building smart carbon monoxide sensor with cellular, Wi-Fi, Ethernet, and battery backup.

FIG. 7 shows a chart of the building smart carbon monoxide sensor with cellular, Wi-Fi, Ethernet, battery backup. A micro controller 600 is reciprocally connected to a carbon monoxide interface companion IC 605 which comprises a carbon monoxide sensor 610. The micro controller 600 is reciprocally connected to the Bluetooth module 615 which is reciprocally connected to the Bluetooth antenna 620. The micro controller 600 is reciprocally connected to a Wi-Fi module 625 which is reciprocally connected to a Wi-Fi antenna 630. The micro controller 600 is reciprocally connected to an Ethernet module 635 which is reciprocally connected to a home router 640. The micro controller 600 is supplied power by the power supply 645 which in an embodiment has a 120 VAC line current. The power supply 645 also supplies power to the Wi-Fi module 625, the power management IC 650, and the battery backup 655. The power management IC 650 is reciprocally connected to the micro controller 600. The power management IC 650 also receives power from the battery backup 655. The micro controller 600 comprises shutoff capability interface 660 for a furnace and generator for example, and also comprises existing home alarm system contact closure 665. The micro controller 600 is reciprocally connected to the cellular modem module 670 which is reciprocally connected to the cellular antenna 675. The cellular modem module 670 is reciprocally connected to the power supply 645. The micro controller controls the piezo alarm 680.

Figure 8:
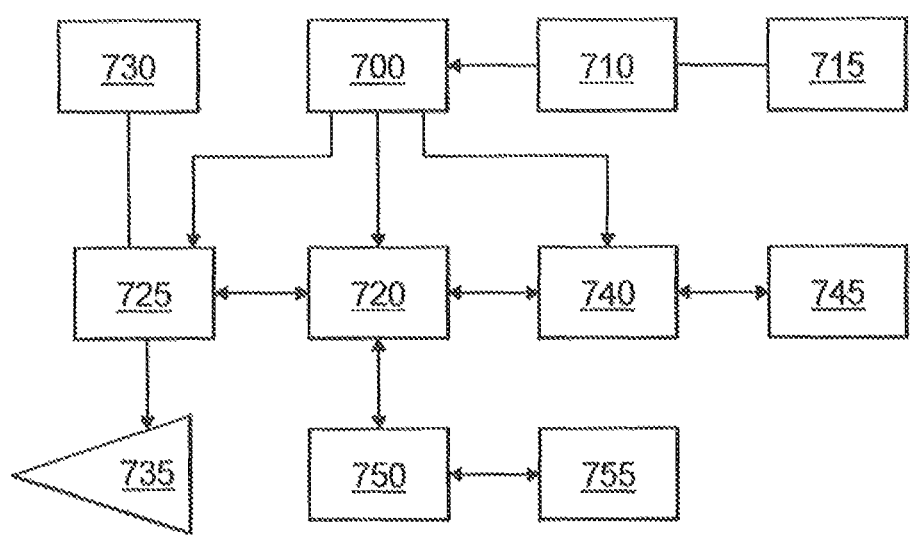
FIG. 8 is a flowchart showing the building Wi-Fi enabled smart carbon monoxide sensor system component.

FIG. 8 shows a chart of the building Wi-Fi enabled smart carbon monoxide sensor system component. The power management IC 700 receives power from the battery backup 710 and the power supply 715. In an embodiment, the power supply 715 receives its power from a 120 VAC line current. The power management IC 700 provides power to the carbon monoxide interface companion IC 725, the micro controller 720 and the Wi-Fi module 740. The carbon monoxide interface companion IC 725 comprises a carbon monoxide sensor 730 and is interfaced with a piezo alarm 735. The carbon monoxide interface companion IC 725 is reciprocally connected to the micro controller 720. Micro controller 720 is reciprocally connected to Wi-Fi module 740 which is reciprocally connected to Wi-Fi antenna 745. Micro controller 720 is reciprocally connected to Bluetooth module 750 which is reciprocally connected to Bluetooth antenna 755.

Figure 9:
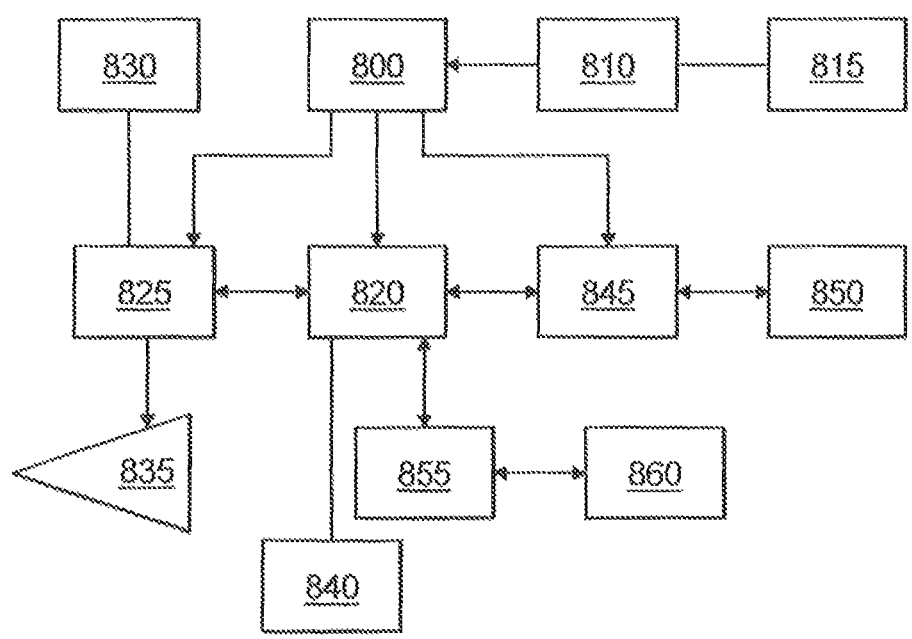
FIG. 9 is a flowchart showing the remote switch building Wi-Fi enabled smart switch-furnace cutoff

FIG. 9 is a chart showing a remote switch building Wi-Fi enabled smart switch furnace cutoff. The power management IC 800 receives power from the battery backup 810 and the power supply 815. In an embodiment, the power supply 815 receives its power from a 120 VAC line current. The power management IC 800 provides power to the carbon monoxide interface companion IC 825, the micro controller 820 and the Wi-Fi module 845. The carbon monoxide interface companion IC 825 comprises a carbon monoxide sensor 830 and is interfaced with a piezo alarm 835. The carbon monoxide interface companion IC 825 is reciprocally connected to the micro controller 820. Micro controller 820 is reciprocally connected to Wi-Fi module 845 which is reciprocally connected to Wi-Fi antenna 850. Micro controller 820 is reciprocally connected to Bluetooth module 855 which is reciprocally connected to Bluetooth antenna 860. The micro controller 820 comprises a furnace interface cutoff relay (smart switch) 840.

Figure 10:
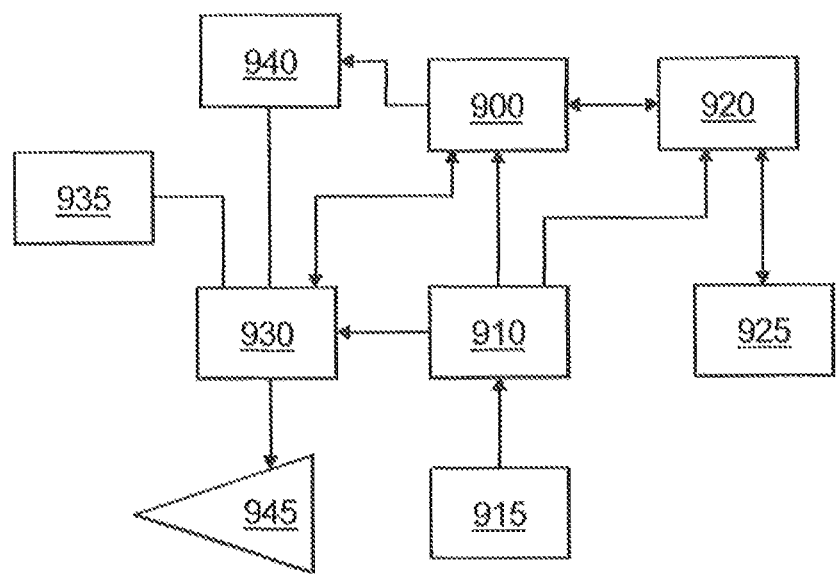
FIG. 10 is a flowchart showing the portable generator heater, base unit-Bluetooth enabled, with fuel line inhibit valve.

FIG. 10 is a chart showing a portable generator, heater, etc. base unit-Bluetooth enabled with fuel line inhibit valve. Micro controller 900 is powered by power management IC 910 which is powered by generator power interface 915. The power management IC 910 also provides power to Bluetooth LE module 920 and carbon monoxide interface companion IC 930.

Micro controller 900 is reciprocally connected to Bluetooth LE module 920 which is reciprocally connected to Bluetooth antenna 925. Micro controller 900 is also reciprocally connected to carbon monoxide interface companion IC 930. Carbon monoxide interface companion IC 930 comprises CO sensor 935 and fuel line inhibit valve relay 940. Carbon monoxide interface companion IC 930 is connected to piezo alarm 945. Micro controller 900 is connected to fuel line inhibit relay valve 940.

The invention claimed is:

1. A carbon monoxide poison prevention system comprising:
   a system smartphone application;
   a system website functionality;
   a module vehicle carbon monoxide prevention system comprising a base that is Bluetooth enabled having a smart carbon monoxide sensor located in said vehicle connected to said system smart phone application;
   said carbon monoxide sensor having a fuel pump inhibit relay and power scavenge capability, wherein said base interrupts current to said fuel pump by opening said fuel pump inhibit relay and breaking circuit depriving or starving engine of fuel and as a result stopping combustion and creation of carbon monoxide;
   hardware comprising a portable carbon monoxide prevention system connected to said smartphone application comprising a sensor base that comprises a smart carbon monoxide sensor;
   hardware comprising a building carbon monoxide prevention system connected to said system smart phone application comprising a sensor base that comprises a smart carbon monoxide sensor.

2. The carbon monoxide poison prevention system of claim 1 wherein said module vehicle carbon monoxide prevention system is mounted or connected to said vehicle's fuse block.

3. The carbon monoxide poison prevention system of claim 1 wherein said carbon monoxide poison prevention system is applied to any form of combustion that creates carbon monoxide from carbon based fuels.

4. The carbon monoxide poison prevention system of claim 1 wherein when a gravity feed fuel system found in oil furnaces, generators and small combustion engines is used, fuel flow is interrupted by a valve that deprives or starves engine of fuel and as a result stop combustion and creation of carbon monoxide.

5. The carbon monoxide poison prevention system of claim 1 wherein said module vehicle carbon monoxide prevention system interfaces and activates windows, ignition, or radio via OBDII/CAN BUS technology.

6. The carbon monoxide poison prevention system of claim 1 wherein each of said systems operates individually by detecting and stopping carbon monoxide at source as well as interfacing between elements of said system.

7. The carbon monoxide poison prevention system of claim 1 wherein said carbon monoxide poison prevention system alerts an individual along with family members, agencies, and others through various persons of interest about carbon monoxide levels.

8. The carbon monoxide poison prevention system of claim 1 wherein said vehicle carbon monoxide prevention system further comprises a vehicle cellular/GPS add on module, provides a complete tracking system used to locate a stolen vehicle, monitor location of a vehicle for fleet monitoring, or tracking of new driver, said cellular modem communicating directly with website to initiate stop combustion and immobilize said vehicle.

9. The carbon monoxide poison prevention system of claim 1 further comprising a base portable generator heater that is Bluetooth enabled with fuel line inhibit valve.

10. The carbon monoxide poison prevention system of claim 1 wherein said building carbon monoxide prevention system having said smart carbon monoxide sensor further comprising cellular, Wi-Fi, Ethernet, or battery backup, said sensor base detects, notifies and prevents further generation of carbon monoxide when connected to a device that has shutoff capability or shutoff device.

11. The carbon monoxide poison prevention system of claim 10 wherein said building carbon monoxide prevention system further comprises a remote switch that comprises a building Wi-Fi enabled smart switch furnace cutoff.

12. The carbon monoxide poison prevention system of claim 1 further comprising smoke alarm integration.

13. The carbon monoxide poison prevention system of claim 1 wherein said systems, module and hardware are connected through various radio frequencies, including but not limited to, Bluetooth, Wi-Fi, Cellular, Global Positioning System (GPS), and Zigbee.

14. The carbon monoxide poison prevention system of claim 1 wherein said carbon monoxide poison prevention system detects presence of carbon monoxide, both absolute and rate of change, and inhibits creation of more carbon monoxide, as well as generating audible or data alarms and escalating notifications, including notification of friends and/or family, fire, rescue and police.

15. The carbon monoxide poison prevention system of claim 10 wherein said building carbon monoxide prevention system interfaces and actuates other smart building devices.

16. The carbon monoxide poison prevention system of claim 1 wherein said carbon monoxide poison prevention system is powered by an inline power scavenging circuit.

17. The carbon monoxide poison prevention system of claim 1 wherein said module vehicle carbon monoxide prevention system interfaces with GM OnStar, Automatic, Drone Mobile by Compustar, Mojio, Zubie, and others to stop engine of a car as well as other value added features.

18. The carbon monoxide poison prevention system of claim 1 wherein each of said smart carbon monoxide sensors is a battery powered ultra low power device that monitors ambient carbon monoxide levels as well as broadcasting them periodically or event driven broadcasts when thresholds are crossed via Bluetooth low energy RF technology.

19. The carbon monoxide poison prevention system of claim 1 wherein said carbon monoxide poison prevention system provides heart beat messages which Indicate normal operation of the modules and hardware of said system, said heart beat messages are escalated based on intelligence provided by different parts of said system.

20. The carbon monoxide poison prevention system of claim 1 wherein said carbon monoxide poison prevention system is dormant for a configurable period of time and is woken up and determines and transmits carbon monoxide levels to said module where further action takes place based on actual carbon monoxide levels.

21. The carbon monoxide poison prevention system of claim 10 wherein said building sensor base is primarily powered by house current via an external power supply that provides dc voltage.

22. The carbon monoxide poison prevention system of claim 1 wherein said module and hardware comprise a battery backup to sustain full operation for a reasonable time.

23. The carbon monoxide poison prevention system of claim 22 wherein when said modules and hardware are operated by battery power, said system alerts a user via audible tones via onboard piezo element, or via smartphone interface as well as website.

24. The carbon monoxide poison prevention system of claim 22 wherein if said battery backup drains completely with no interaction, website functionality interprets lack of communication as a potentially serious event and escalates notifications as determined by software configuration.

25. The carbon monoxide poison prevention system of claim 1 wherein said carbon monoxide poison prevention system has Bluetooth capability for short range communication as well as programming and interface capability to said smartphone application.

26. The carbon monoxide poison prevention system of claim 1 wherein each of said carbon monoxide sensors is coupled to a micro-controller which processes actual carbon monoxide levels and rate of change of carbon monoxide levels to create events that trigger various programmable and configurable escalating actions, alerts, notifications and alarms.

27. The carbon monoxide poison prevention system of claim 26 wherein each of said sensors is activated when a rate of change threshold with respect to time is reached and exceeded.

28. The carbon monoxide poison prevention system of claim 1 wherein said carbon monoxide poison prevention system interfaces with one or more of said carbon monoxide sensor units that monitor carbon monoxide levels.

29. The carbon monoxide poison prevention system of claim 1 wherein said vehicle carbon monoxide prevention system contains onboard cellular capability that connects to local Internet periodically to test connection as well as serve as a failsafe backup if wired or Wi-Fi systems cease to have Internet connectivity.

30. The carbon monoxide poison prevention system of claim 1 wherein said carbon monoxide poison prevention system is connected to an existing alarm system.

31. The carbon monoxide poison prevention system of claim 10 further comprising contact closures to shut off furnaces, generators and other hard wired devices.

32. The carbon monoxide poison prevention system of claim 1 wherein said carbon monoxide poison prevention system has programmatic capability to shut off other internet or Wi-Fi connected devices.

33. The carbon monoxide poison prevention system of claim 1 wherein said carbon monoxide poison prevention system comprises a remote sensor that is a Wi-Fi enabled smart carbon monoxide sensor unit that is line current power with battery back-up powered device that monitors ambient carbon monoxide levels as well as broadcasting them periodically or event driven broadcast when threshold carbon monoxide levels or carbon monoxide rate of change with respect to time threshold are crossed via Wi-Fi RF technology to said base.

34. The carbon monoxide poison prevention system of claim 33 wherein said unit sends informational heartbeat messages to Wi-Fi enabled base and ultimately to smartphone via web functionality, said heartbeat messages are escalated based on intelligence from smartphone and web and their further interface capabilities, said heartbeat is a periodic signal generated by module or device to indicate normal operation of module or device.

35. The carbon monoxide poison prevention system of claim 11 wherein a line current power with battery backup powered device opens furnace emergency shutoff circuit and thereby stops further creation of carbon monoxide.

36. The carbon monoxide poison prevention system of claim 1 wherein said carbon monoxide poison prevention system provides dashboard functionality that gives smartphone instant access to: battery life, communication capabilities, and important system status values.

37. The carbon monoxide poison prevention system of claim 1 wherein said smartphone application provides real-time moving map display Integration of GPS location data.

38. The carbon monoxide poison prevention system of claim 1 wherein said smartphone application provides website integration.

39. The carbon monoxide poison prevention system of claim 1 wherein said smartphone application has accelerometer interface back to said vehicle carbon monoxide prevention system.

40. The carbon monoxide poison prevention system of claim 1 wherein said bluetooth enabled vehicle base comprises a fuel pump inhibit relay that determines if user is present and vehicle is moving.

41. A method for carbon monoxide poison prevention comprising:
pairing a system smartphone application directly with Bluetooth enabled vehicle base unit with fuel pump inhibit relay and Bluetooth enabled smart carbon monoxide sensor unit, said sensor unit located in said vehicle;
pairing said system smartphone application directly with a building or home carbon monoxide prevention system comprising a sensor base that comprises a smart carbon monoxide sensor unit with cellular, Wi-Fi, Ethernet, or battery backup, or a combination;
monitoring local ambient atmosphere by said smart carbon monoxide sensor unit for carbon monoxide levels through attached electro-chemical carbon monoxide sensor, or a similar device;
periodically transmitting carbon monoxide levels from said smart carbon monoxide sensor unit to said system smartphone application;
sending event based messages to said system smartphone application if a rise in carbon monoxide level begins to occur;
triggering alarms via built in audio element in said smartphone application and vehicle base unit, building or home unit when elevated carbon monoxide levels are sensed;
preventing further generation of carbon monoxide by breaking circuit or shutting off devices, as a result stopping combustion or creation of carbon monoxide, if carbon monoxide threshold is exceeded, or if rate of change of carbon monoxide level is above a predetermined threshold rate with respect to time and or location.

42. The method of claim 41 wherein said method is applied to any form of combustion that creates carbon monoxide, even if it does not use an engine.

43. The method of claim 41 wherein said triggering is based on programmable and configurable predetermined values, historical data or best practices.

44. The method of claim 41 further comprising:
receiving and storing system related data on a website to serve as a centralized HUB.

45. A carbon monoxide poison prevention system comprising:
a system smartphone application;
automobile Bluetooth enable smart carbon monoxide sensor with fuel pump inhibit relay and power scavenge ability connected to said system smart phone application;
said automobile Bluetooth enable smart carbon monoxide sensor located in said automobile;
wherein said smart carbon monoxide sensor interrupts current to said fuel pump by opening said fuel pump inhibit relay and breaking circuit depriving or starving engine of fuel and as a result stopping combustion and creation of carbon monoxide;
building or home Wi-Fi, Ethernet, Bluetooth, or Battery backup, enabled smart carbon monoxide sensor connected to said system smart phone application;
system website functionality;
said building further comprising Wi-Fi enabled cutoff switch;
said automobile further comprising a cellular/GPS add on module.

46. An automobile carbon monoxide poison prevention system comprising:
system smartphone application connected via a Bluetooth connection path to a Bluetooth enabled smart carbon monoxide sensor which contains carbon monoxide sensor;
said system smartphone application connected via a Bluetooth connection path to a Bluetooth enabled automobile base unit with fuel pump inhibit relay which is connected via Bluetooth connection path to said Bluetooth enabled smart carbon monoxide sensor;
said Bluetooth enabled automobile base unit comprised of fuel pump inhibit relay and power scavenge capability, fuel pump fuse, fuel pump and a battery;
microcontroller fed by power management IC which is fed by power scavenge circuit which is fed by a battery;
said power management IC connected to Bluetooth LE module and carbon monoxide interface companion IC;
said microcontroller reciprocally connected to Bluetooth module which is reciprocally connected to Bluetooth Antenna;
said microcontroller connected to said fuel pump inhibit relay, which is connected to said carbon monoxide interface companion IC which comprises said carbon monoxide sensor connected to a piezo alarm;
said microcontroller is reciprocally connected to said carbon monoxide interface companion IC.

47. A building, office or home carbon monoxide poison prevention system comprising:
smart carbon monoxide sensor with cellular, Wi-Fi, Ethernet, and/or battery backup;
a micro controller reciprocally connected to a carbon monoxide interface companion IC which comprises said smart carbon monoxide sensor interfaced with a piezo alarm;
said micro controller reciprocally connected to Bluetooth module, Wi-Fi module and/or Ethernet which is reciprocally connected to Bluetooth antenna, Wi-Fi antenna or home router;
power supply supplies power to micro controller, Wi-Fi module, power management IC, and battery backup;
said power management IC reciprocally connected to said micro controller;
said micro controller comprises shutoff capability interface for a combustion generating device generator, heater, or furnace;
said micro controller controls alarm.

48. The system of claim 47 wherein said micro controller is reciprocally connected to cellular modem module which is reciprocally connected to cellular antenna, said cellular modem module reciprocally connected to said power supply.

* * * * *